(12) United States Patent
Wenisch et al.

(10) Patent No.: US 7,100,054 B2
(45) Date of Patent: Aug. 29, 2006

(54) COMPUTER NETWORK SECURITY SYSTEM

(75) Inventors: Thomas F. Wenisch, Narragansett, RI (US); Stephen R. Berard, Seattle, WA (US); David J. Smith, East Greenwich, RI (US)

(73) Assignee: American Power Conversion, West Kingston, RI (US)

( * ) Notice: Subject to any disclaimer, the term of this patent is extended or adjusted under 35 U.S.C. 154(b) by 842 days.

(21) Appl. No.: 09/925,958

(22) Filed: Aug. 9, 2001

(65) Prior Publication Data

US 2003/0033545 A1 Feb. 13, 2003

(51) Int. Cl.
*H04L 9/32* (2006.01)
*G06F 7/04* (2006.01)

(52) U.S. Cl. .......................... 713/185; 726/5
(58) Field of Classification Search ........... 713/202, 713/153, 201, 168
See application file for complete search history.

(56) References Cited

U.S. PATENT DOCUMENTS 6,766,454 B1 * 7/2004 Riggins ................. 713/185

2003/0005286 A1 * 1/2003 McGarvey ............ 713/155
2003/0105966 A1 * 6/2003 Pu et al. ................ 713/186

* cited by examiner

Primary Examiner—Matthew Smithers
(74) Attorney, Agent, or Firm—Mintz, Levin, Cohn, Ferris, Glovsky and Popeo, P.C.

(57) ABSTRACT

A method and system are provided for authenticating a user of a computer over a computer network. In one embodiment of the invention, the method includes transmitting an applet having a challenge string and a first encryption key, receiving a login packet having the challenge string and a password that is encrypted using the first encryption key, decrypting the password, receiving information from an authentication provider, and authenticating the password by using the information provided by the authentication provider. The challenge string can be either a sequence number or a session identifier. The authentication provider can be a software program or an authentication server. An advantage of embodiments of the present invention is that a computer can provide secure Internet communications using a web browser that does not support SSL and can provide secure integration with third party security systems.

34 Claims, 6 Drawing Sheets

COMPUTER NETWORK SECURITY SYSTEM

FIELD OF THE INVENTION

The present application relates generally to providing secure communications over a computer network such as the Internet.

BACKGROUND OF THE INVENTION

The Secure Socket Layer (SSL) is a well known security protocol developed by Netscape® for transmitting private documents securely over the Internet. The SSL protocol works by using a private key to encrypt data that's transferred over an SSL connection. Many web sites use the SSL protocol to obtain confidential user information, such as a credit card number. The use of this protocol may not be desirable for all uses, however, because the use of SSL can require the purchase of a certificate.

A device that can authenticate users over the Internet is the Web/SNMP management card that has part number AP9606 and is manufactured by the American Power Conversion, Corp. of West Kingston, R.I. When the AP9606 card is first installed, the user programs it with an authentication phrase. This authentication phrase becomes a shared secret between the AP9606 card and the user. The AP9696 card provides security by transmitting an applet from the AP9606 card to a web browser, and the applet uses the shared secret to authenticate the user. Additionally, the AP9606 card also secures form data using this applet by hashing form fields with the shared secret. The AP9606 card can also provide management of uninterruptible power supplies (UPS's) via multiple open standards like Telnet, HTTP, and SNMP. Through the AP9606 card, a user can monitor and configure UPS's to complete tasks, such as shutting down and rebooting a user's computer system, receiving email alerts and providing an event log. However, due to the frequent necessity of conducting secure communications over the Internet and other networks, a system having even more secure access to web pages is desired.

SUMMARY OF THE INVENTION

In one embodiment of the invention, a method is provided for authenticating a user of a computer over a computer network. The method includes transmitting an applet having a designation, such as a challenge string, and a first encryption key, receiving a login packet having the challenge string and a password that is encrypted using the first encryption key, decrypting the password, and authenticating the password by using information provided by an authentication provider. The challenge string can be either a sequence number or a session identifier or another numerical or alphanumerical identifier. The login packet can further include a user name, wherein the session identification, the user name, and the password are encrypted. Additionally, the login packet can include a hash of the session identification, the user name, and the password. The above method can also include changing the encryption key on a predetermined basis to increase the level of security. Also, the above method can include transmitting to the computer a form and a second unique sequence identification; receiving from the computer the response data of the form and a hash of the second unique sequence identification, the user password, and fields and values entered on the form; and authenticating the fields and the values entered on the form.

In another embodiment of the invention, a system is provided for authenticating a user of a computer over a computer network. The system includes a web server coupled to the computer network, wherein the web server is programmed to: transmit an applet having a challenge string and a first encryption key; receive a login packet having the challenge string and a password that is encrypted using the first encryption key; decrypt the password; and authenticate the password by using information provided by an authentication provider.

In yet another embodiment of the invention, an article of manufacture is provided that includes a computer readable medium having computer readable program code for authenticating a user of a client computer over a computer network, the computer readable program code including instructions for: causing the computer system to transmit an applet having a challenge string and a first encryption key; causing the computer system to receive a login packet having the challenge string and a password that is encrypted using the first encryption key; causing the computer system to decrypt the password; and causing the computer system to authenticate the password by using information provided by an authentication provider.

The web server can be a computer program installed on the computer or a server computer. The authentication provider can be an authentication server or can be a software program installed on the computer in communication with the computer network.

An advantage of embodiments of the present invention is that a computer can provide secure Internet communications using a web browser that does not support SSL. Yet another advantage of embodiments of the present invention is that a computer can easily provide secure integration with third party security systems. The level of security provided by the present invention can be as high as the security obtained with the known MD5 and RSA security algorithms.

BRIEF DESCRIPTION OF THE DRAWINGS

For a better understanding of the present invention, reference is made to the drawings which are incorporated herein by reference and in which.

DETAILED DESCRIPTION OF THE INVENTION

A first embodiment of a system 10 of the present invention will now be described with reference to FIG. 1. The system 10 includes one or more client computers 12a–c each coupled to a computer network 13, such as a wide area network (WAN), a local area network (LAN) or the Internet. A web server 14 and an authentication server 16 are also coupled to the computer network 13. The authentication server 16 assists the web server 14 in providing secure access to a web page on the web server 14. An uninterruptible power supply (UPS) 15 can be coupled to the web server to provide power to the computer in case of a power failure to the computer.

One of the computers 12*a*–*c* can access the web servers 14 through network 13 to obtain a web page having information, for example, about the status of UPS 15. A user on one of the computers 12*a*–*c* can also access a web page on the web server 14 to obtain information about the UPS 15 and may be able to configure or control the UPS 15.

Figure 1:
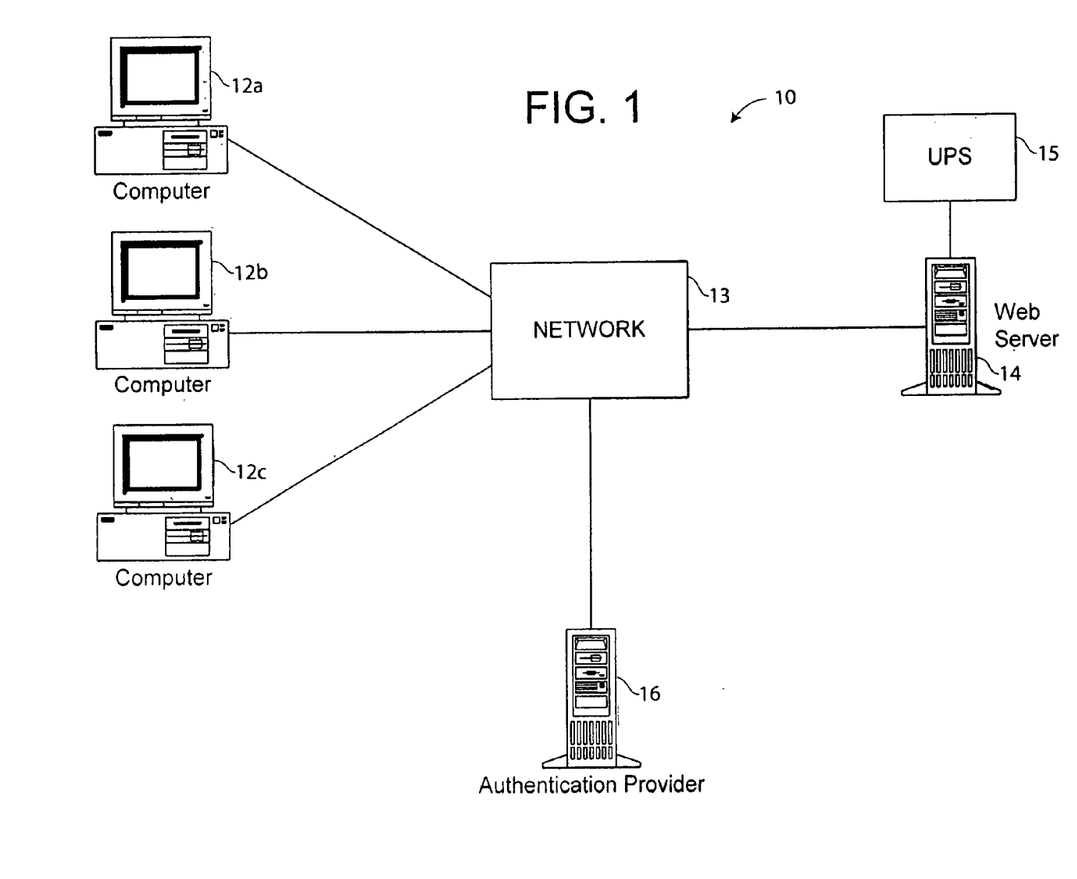
FIG. 1 is a diagram of the system for providing network security according to the present invention.
Figure 2:
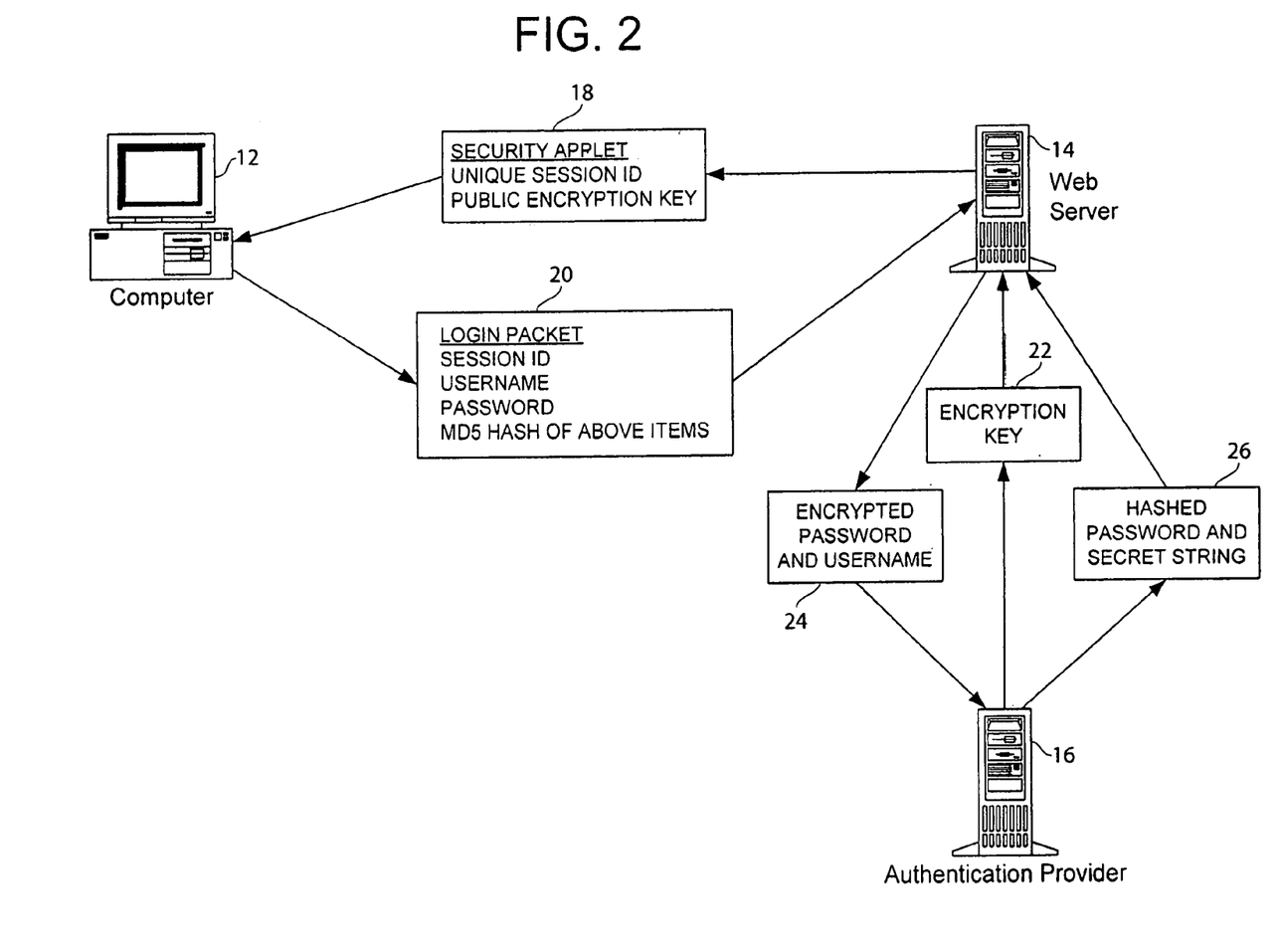
FIG. 2 is a diagram showing the operation of the system of FIG. 1 to authenticate a user.

FIG. 2 shows an illustrative example of how a user can be authenticated to access information from the web server 14 using the system 10 of FIG. 1. Initially, a user is provided with a password known to or recognizable by the authentication server 16. This can be accomplished in several ways, such as providing the user with the password electronically through e-mail or a web page, or providing the user with the password through the mail, over the telephone or in person.

After a user has received a valid password known by the authentication server 16, the user can attempt to access a secured web page on web server 14. When the user of the computer 12 first accesses the secured web page on web server 14, the user's web browser is redirected to a URL of a login page. The web server 14 transmits two frames for the login page, one of the frames being visible to the user and the other being hidden from view of the user. The visible frame contains a form having fields for the user to enter a username, a password or other credentials. The second hidden frame has no visible components, such as a frame with a width or height of zero pixels, and contains a security applet 18.

The security applet 18 is provided with a challenge string, such as a unique session identification (ID) or a sequence number, and an encryption key as parameters from the web server. When the user transmits the login form to the web server by clicking a login button or some other means, the security applet 18 in the hidden frame retrieves the user name and password from the login form, and creates a login packet to be sent to the web server.

The login packet 20 can, but not necessarily, contain the challenge string, such as the session ID provided by the server, the username, and the password or other credentials in encrypted form and a hash of the data in these three fields. The hash can be performed using an algorithm such as the well known MD5 hashing algorithm. The encryption can be performed using a well known RSA encryption algorithm and the server's public key. The login packet is transmitted to the web server as text. After the login packet 20 is transmitted to the web server 14, the security applet 18 resides in the hidden frame in memory of the computer 12 the username, session ID, and password of the user until the user closes their browser or accesses a different web page other than one associated with the secure page supplied from the web server 14. During the login process, all content that the user sees is displayed in the visible frame.

Figure 6:
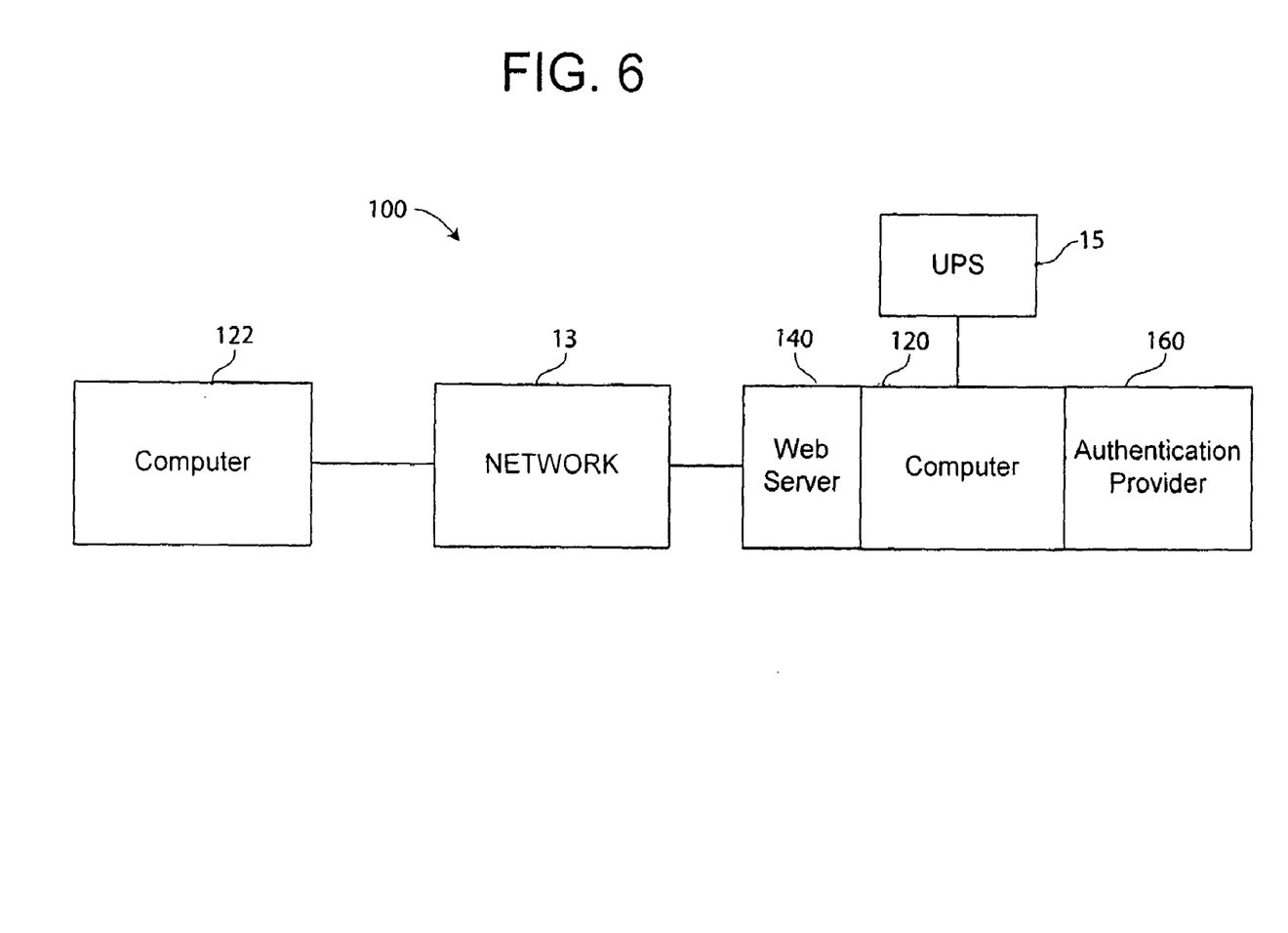
FIG. 6 is a diagram of a second embodiment of the system for providing network security according to the present invention.

Upon receiving the login packet from the computer 12, the web server 14 verifies the hash and decrypts the password and/or credentials depending on what the user submitted. The web server 14 communicates with an authentication provider 16 by, for example, opening a connection, such as a TCP/IP connection with the authentication provider 16. The authentication provider 16 can be located on a separate server as shown in FIG. 6 or can be a separate process running somewhere in the user's network that integrates with the user's general security system, such as the Domain Controller from Windows NT 4 ® or Keberos, which is an open authentication scheme developed at the Massachusetts Institute of Technology.

The web server requests an encryption key from the authentication provider 16 and encrypts the user's password and/or credentials using the encryption key transmitted from the authentication provider 16. The web server 14 then transmits to the authentication provider 16 authentication data including the username and encrypted credentials and requests that the authentication provider verify the authentication data.

The authentication provider 16 receives and decrypts the authentication data and validates it using a security method, such as Windows NT® system call.

The authentication provider 16 then creates a response for the web server 14 by hashing the decrypted credentials and a secret string. As noted above, a hash algorithm such as, for example, the MD5 hashing algorithm can be used. The secret string is preferably known only to the integration provider and the web server and can be a text message, such as "PASSWORD OK." The hash code 26 is transmitted to the web server 14 and the web server verifies that it is correct. If the hash code 26 is correct, then the web server 14 grants the user access to the web site.

Once the web server 14 has granted the user access to the web site, the web server enables the session ID provided to the user with the security applet 18 such that it can now be used to view and retrieve web pages. The preferable way to use the user's session ID is to have the session ID as part of the URL of each page request to the web server. Alternatively, the session ID could be transmitted to the web server with each request in another form, such as in a cookie, or in response to a hidden form. To provide additional security, the session ID preferably expires if the user doesn't make a page request after a predetermined time interval.

Figure 3:
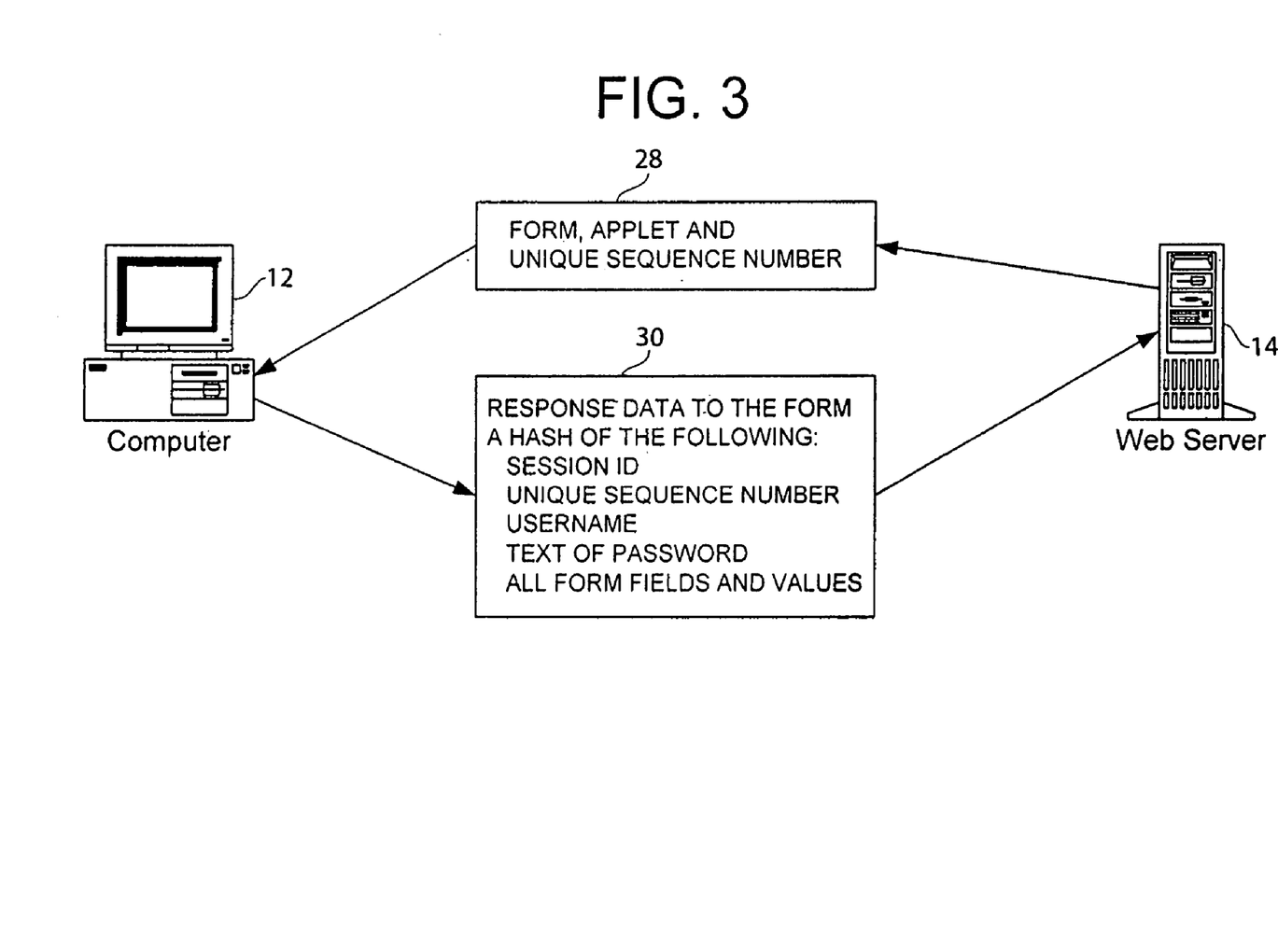
FIG. 3 is a diagram showing the operation of the system of FIG. 1 to transmit to the web server a security applet with a form.

FIG. 3 shows an illustrative example of how the web server 14 of FIG. 1 can also authenticate each form response submitted to the web server to prevent against falsified or modified form data from being submitted to the web server. In one embodiment, each web form that the web server 14 transmits to the computer 12 contains an additional hidden field for a form signature. The response to this signature field is to transmit to the web server 14 the hash generated by the applet. When a user requests a form from the web server 14, the web server transmits to the computer 12 the requested form along with a unique sequence number 28 generated by the web server and assigned to the session ID.

A program, using code such as JavaScript, can be used to transmit data from the form to the web server when the user fills out and submits the form to the web server. The program can collect the name and contents of each field in the form and the session number provided for this form request and pass this data to the hidden security applet which still is in memory in the hidden frame. The security applet then creates authentication data 30 including a hash code of the session ID, sequence number, plaintext user password, and all fields and values on the web form. As noted above, the hashing method used can be the MD5 hashing algorithm. The authentication data 30 is then submitted with the form and verified by the web server 14. This method protects the form against tampering or "replaying."

Figure 4:
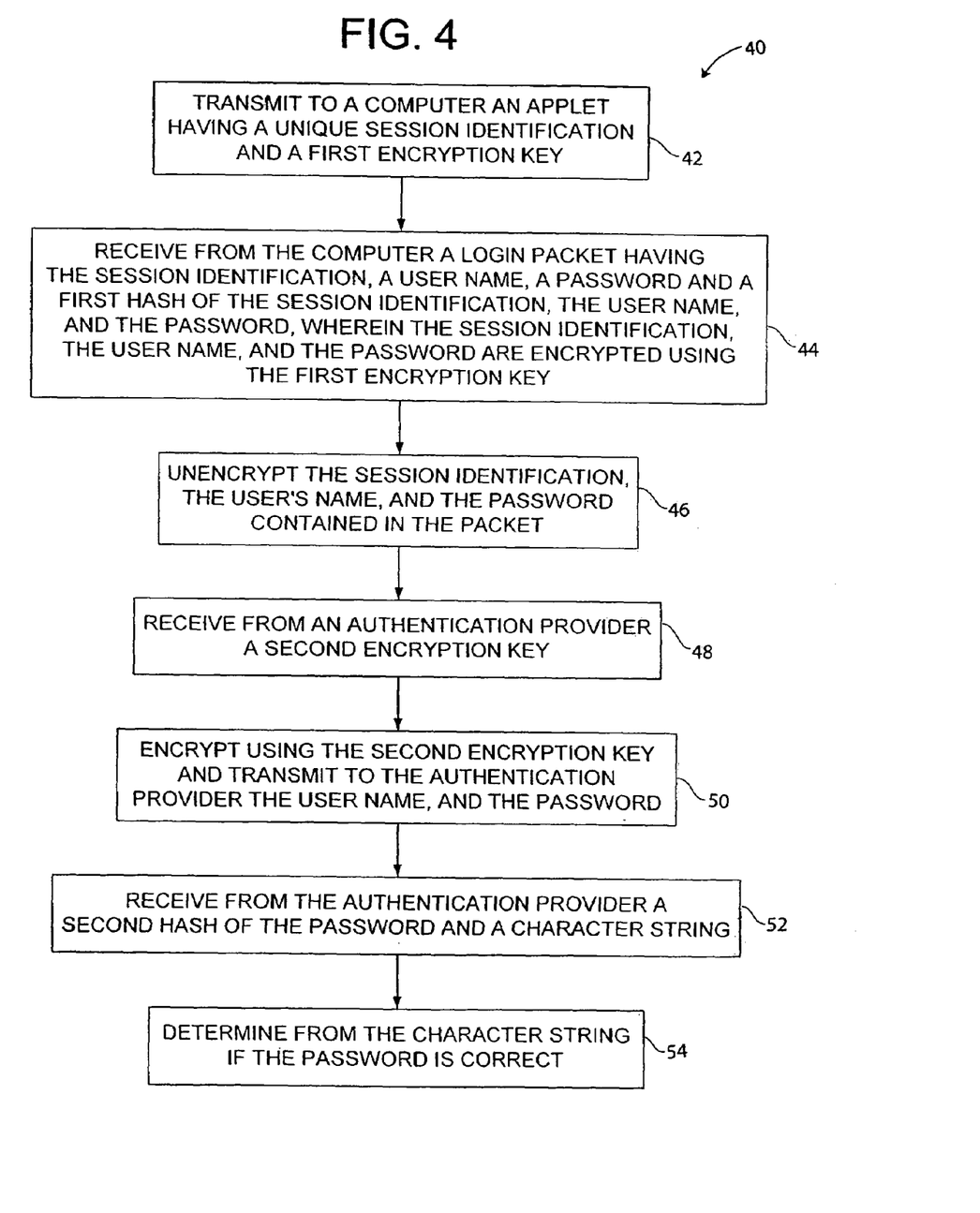
FIG. 4 is a flowchart for providing network security according to the present invention.

A method 40 for authenticating a user of a computer over the computer network of FIG. 1 will now be described with reference to FIG. 4. At 42, an applet having a unique session identification and a first encryption key is transmitted to a computer. The applet can be transmitted by a web server that can be a server coupled to the network or a computer program installed and running on the computer. At 44, a login packet is received from the computer that has the session identification, a user name, a password and a first hash of the session identification, the user name, and the password. In the login packet, the session identification, the user name, and the password are encrypted using the first encryption key. At 46, the session identification, the user's name, and the password contained in the packet are decrypted. At 48, a second encryption key is received from an authentication provider. The authentication provider can be a server having a security program running thereon or it can be a program accessible by the network. At 50, the user name and the password are encrypted using the second encryption key and transmitted to the authentication provider. At 52, a second hash of the password and a character string is received from the authentication provider. At 54, it is determined from the character string if the password is correct.

Figure 5:
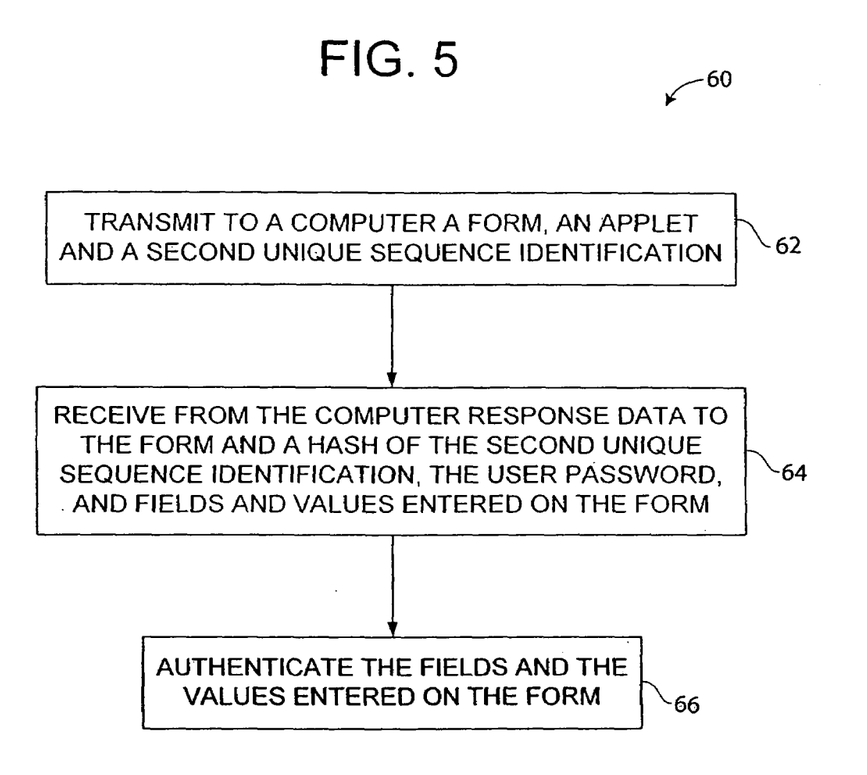
FIG. 5 is a flowchart used in conjunction with the flowchart of FIG. 4 for providing authentication of information submitted on a form over the web.

A method 60 for authenticating a form submitted by the user of a computer over the computer network of FIG. 1 will now be described with reference to FIG. 5. The method of FIG. 5 can be used in conjunction with the method of FIG. 4. At 62, a security applet, a form and a second unique sequence ID are submitted to the computer. The form and the second unique sequence ID can be transmitted by a web server that can be a server coupled to the network or a computer program installed and running on the computer. At 64, response data to the form and a hash of the second unique sequence identification, the user password, and fields and values entered on the form are received from the computer. At 66, the fields and the values entered on the form are authenticated.

FIG. 6 shows another embodiment of the invention that includes a system 100 having a computer 120 that is coupled to a computer network 13. The system 100 shown in FIG. 6 differs from the system 10 shown in FIG. 1 in that the computer 120 has software installed thereon that functions as an authentication provider 160 in addition to having software installed thereon that functions as a web server 140. An uninterruptible power supply (UPS) 15 can be coupled to the computer 120 to provide power to the computer in case of a power failure to the computer. The authentication provider 160 can be a software program in communication with the network 13, such as the Domain Controller security in Windows NT 4® or Keberos. The authentication provider 160 assists the web server 14 in providing secure access to a web page on the web server 14. Although FIGS. 2 and 3 are shown using the system of FIG. 1, they could equally use the system 100 of FIG. 6.

With the system 100 of FIG. 6, the computer 122 can access the web server 140 through network 13 to obtain a web page having information, for example, about the UPS 15 connected to the computer 120. A user on computer 122 can also access a web page on the web server 140 to control or configure the UPS 15. A user on the computer 120 can also obtain information about the UPS 15, and maybe able to configure or control the UPS 15. The web server 140 can also provide information typically obtained over the Internet.

Advantages of embodiments of the present invention include preventing the unauthorized access to secure pages, the stealing of passwords by a third party, the falsification or modification of form data or the replaying of a valid form submission at a later time. Additionally, embodiments of the present invention do not require the licensing of security technology, such as SSL, from a third party vendor, and does not require special support in a user's web browser, such as https. Since authentication packets are transparent to the web server, the present invention can be used to integrate with any third party vendor's security application program interface (API) simply by modifying an applet and the software for an authentication or integration server.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting. The invention's limit is defined only in the following claims and the equivalents thereto.

What is claimed is:

1. A method for authenticating a user of a computer, the method comprising:
   transmitting a signal having a challenge string and a first encryption key;
   receiving a login packet having the challenge string and a password that is encrypted using the first encryption key and a hash of at least the challenge string and the password;
   decrypting the password;
   receiving information from an authentication provider; and
   authenticating the password by using the information received from the authentication provider.

2. The method of claim 1, wherein receiving a login packet comprises receiving from a computer a login packet having a challenge string, a user name, a password, wherein the challenge string, the user name, and the password are encrypted using the first encryption key.

3. The method of claim 2, wherein receiving a login packet comprises receiving from a computer a login packet having a hash of a session identification, the user name, and the password.

4. A method for authenticating a user of a computer, the method comprising:
   transmitting a signal having a challenge string and a first encryption key;
   receiving a login packet having the challenge string and a password that is encrypted using the first encryption key;
   decrypting the password;
   receiving information from an authentication provider; and
   authenticating the password by using the information received from the authentication provider
   wherein transmitting a signal having a challenge string comprises transmitting an applet having a sequence number.

5. A method for authenticating a user of a computer, the method comprising:
   transmitting a signal having a challenge string and a first encryption key;
   receiving a login packet having the challenge string and a password that is encrypted using the first encryption key;
   decrypting the password;
   receiving information from an authentication provider; and
   authenticating the password by using the information received from the authentication provider
   wherein transmitting a signal having a challenge string comprises transmitting an applet having a session identifier.

6. A method for authenticating a user of a computer over a computer network, the method comprising:
transmitting to the computer a signal having a unique session identifier and a first encryption key;
receiving from the computer a login packet having the session identification, a user name, a password and a first hash of the session identification, the user name, and the password, wherein the session identification, the user name, and the password are encrypted using the first encryption key;
decrypting the session identification, the user's name, and the password contained in the packet;
receive information from an authentication provider; and
authenticating the user's name and the password by using the information provided by the authentication provider.

7. The method of claim 6, wherein authenticating the user's name and the password by using the information provided by the authentication provider comprises:
receiving from the authentication provider a second encryption key;
encrypting the user name and the password using the second encryption key and transmitting the encrypted user name and password to the authentication provider;
receiving from the authentication provider a second hash of the password and a character string; and
determining from the second hash if the password is correct.

8. The method of claim 7, wherein the authentication provider includes an authentication server.

9. The method of claim 7, wherein the first hash and the second hash both include an MD5 hash.

10. The method of claim 7, further comprising changing the first and the second encryption keys on a predetermined basis.

11. The method of claim 6, further comprising:
transmitting to the computer a form and a second unique sequence identification;
receiving, from the computer, response data to the form and a third hash of the second unique sequence identification, the user password, and fields and values entered on the form; and
authenticating the fields and the values entered on the form.

12. The method of claim 6, wherein the authentication provider includes an authentication server.

13. The method of claim 6, wherein the authentication provider includes a software program in communication with the computer network.

14. The method of claim 6, wherein the authentication provider includes a software program in communication with the computer network.

15. A system for authenticating a user of a computer coupled to a computer network, the system comprising:
a web server coupled to the computer network, wherein the web server is programmed to:
transmit a signal having a challenge string and a first encryption key;
receive a login packet having the challenge string and a password that is encrypted using the first encryption key and a hash of at least the challenge string and the password;
decrypt the password;
receive information from an authentication provider; and
authenticate the password by using the information provided by the authentication provider.

16. The system of claim 15, wherein the login packet further comprises a user name and a session identification and wherein the user name and the password are encrypted using the first encryption key.

17. The system of claim 16, wherein the login packet further comprises a hash of the session identification, the user name, and the password.

18. A system for authenticating a user of a computer coupled to a computer network, the system comprising:
a web server coupled to the computer network, wherein the web server is programmed to:
transmit a signal having a challenge string and a first encryption key;
receive a login packet having the challenge string and a password that is encrypted using the first encryption key;
decrypt the password;
receive information from an authentication provider; and
authenticate the password by using the information provided by the authentication provider
wherein the signal is an applet and the challenge string includes a sequence number.

19. A system for authenticating a user of a computer coupled to a computer network, the system comprising:
a web server coupled to the computer network, wherein the web server is programmed to:
transmit a signal having a challenge string and a first encryption key;
receive a login packet having the challenge string and a password that is encrypted using the first encryption key;
decrypt the password;
receive information from an authentication provider; and
authenticate the password by using the information provided by the authentication provider
wherein the signal is an applet and the challenge string includes a session identifier.

20. A system for authenticating a user of a computer over a computer network coupled to a security server, the system comprising:
a web server coupled to the computer and the computer network, wherein the web server is programmed to:
transmit to the computer a signal having a unique session identification and a first encryption key and;
receive from the computer a login packet having the session identification, a user name, a password and a first hash of the session identification, the user name, and the password, wherein the session identification, the user name, and the password are encrypted using the first encryption key;
decrypt the session identification, the user's name, and the password contained in the packet;
receive information from an authentication provider; and
authenticate the user's name and the password by using the information provided by the authentication provider.

21. The system of claim 20, wherein to authenticate the user's name and the password by using the information provided by the authentication provider, the web server is programmed to:
receive from the authentication provider a second encryption key;
encrypt using the second encryption key and transmit to the authentication provider the user name and the password;
receive from the authentication provider a second hash of the password and a character string; and determine from the second hash if the password is correct.

22. The system of claim 21, wherein the authentication provider includes an authentication server.

23. The system of claim 21, wherein the authentication provider includes a software program in communication with the computer network.

24. The system of claim 21, wherein the first and the second encryption keys are changed on a predetermined basis.

25. The system of claim 20, wherein the authentication provider includes an authentication server.

26. The system of claim 20, wherein the authentication provider includes a software program in communication with the computer network.

27. The system of claim 20, wherein the web server includes a computer program installed on the computer.

28. An article of manufacture, comprising:
a computer readable medium having computer readable program code for authenticating a user of a client computer over a computer network, the computer readable program code including instructions for:
causing a computer system to transmit a signal having a challenge string and a first encryption key;
causing the computer system to receive a login packet having the challenge string and a password that is encrypted using the first encryption key and a hash of at least the challenge string and the password;
causing the computer system to decrypt the password;
causing the computer system to receive information from an authentication provider; and
causing the computer system to authenticate the password by using the information provided by the authentication provider.

29. The article of manufacture of claim 28, wherein the computer readable program code having instructions for causing the computer system to receive a login packet comprises causing the computer system to receive from a computer a login packet having a challenge string, a user name, a password, wherein a session identification, the user name, and the password are encrypted using the first encryption key.

30. The method of claim 28, wherein the computer readable program code having instructions for causing the computer system to receive a login packet comprises causing the computer system to receive from a computer a login packet having a hash of the session identification, the user name, and the password.

31. An article of manufacture, comprising:
a computer readable medium having computer readable program code for authenticating a user of a client computer over a computer network, the computer readable program code including instructions for:
causing the computer system to transmit to the client computer a signal having a unique session identification and a first encryption key;
causing the computer system to receive from the client computer a login packet having the session identification, a user name, a password and a first hash of the session identification, the user name, and the password, wherein the session identification, the user name, and the password are encrypted using the first encryption key;
causing the computer system to decrypt the session identification, the user's name, and the password contained in the packet; and
causing the computer system to receive information from an authentication provider; and
causing the computer system to authenticate the user's name and the password by using the information provided by the authentication provider.

32. The article of manufacture of claim 31, wherein the instructions for causing the computer system to authenticate the user's name and the password by using the information provided by the authentication provider comprises:
causing the computer system to receive from the authentication provider a second encryption key;
causing the computer system to encrypt using the second encryption key and transmit to the authentication provider the user name and the password;
causing the computer system to receive from the authentication provider a second hash of the password and a character string; and
causing the computer system to determine from the character string if the password is correct.

33. The article of manufacture of claim 31, wherein the computer readable program code further comprises instructions for:
causing the computer system to change the first and the second encryption keys on a predetermined basis.

34. The article of manufacture of claim 31, wherein the computer readable program code further comprises instructions for:
causing the computer system to transmit to the client computer a form and a second unique sequence identification;
causing the computer system to receive from the client computer response data to the form and a hash of the second unique sequence identification, the user password, and fields and values entered on the form; and
causing the computer system to authenticate the fields and the values entered on the form.

* * * * *